(12) United States Patent
Ubhi et al.

(10) Patent No.: US 9,354,296 B2
(45) Date of Patent: May 31, 2016

(54) DYNAMIC SELECTION OF UNMANNED AERIAL VEHICLES

(71) Applicant: Verizon Patent and Licensing Inc., Arlington, VA (US)

(72) Inventors: Gurpreet Ubhi, Nutley, NJ (US); Ashok N. Srivastava, Mountain View, CA (US); Douglas M. Pasko, Bridgewater, NJ (US); Hani Batla, Teaneck, NJ (US); Igor Kantor, Raleigh, NC (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 276 days.

(21) Appl. No.: 14/282,345

(22) Filed: May 20, 2014

(65) Prior Publication Data

US 2015/0379874 A1 Dec. 31, 2015

(51) Int. Cl.
*G01C 23/00* (2006.01)
*G01S 5/00* (2006.01)

(52) U.S. Cl.
CPC .......... *G01S 5/0027* (2013.01); *G01S 2205/005* (2013.01)

(58) Field of Classification Search
CPC .. B64C 2201/141; B64C 29/02; B64C 1/061; G01S 5/0027; G01S 2205/005; G05D 1/104
USPC .................. 701/3, 13, 14; 244/75.1
See application file for complete search history.

(56) References Cited

U.S. PATENT DOCUMENTS

2005/0006525 A1* 1/2005 Byers et al. ............... 244/118.1
2009/0118875 A1* 5/2009 Stroud ....................... 701/3

OTHER PUBLICATIONS

Redding et al., "Distributed Multi-Agent Persistent Surveillance and Tracking with Health Management", American Institute Aeronautics and Astronautics, AIAA Guidance, Navigation, and Control Conference, 2011, 18 pages.
Richards et al., "Model Predictive Control of Vehicle Maneuvers with Guaranteed Completion Time and Robust Feasibility", American Control Conference, 2003, Proceedings of the 2003, vol. 5, IEEE, 2003, 7 pages.
Park et al., "Agent Technology for Coordinating UAV Target Tracking", Knowledge-Based Intelligent Information and Engineering Systems, Springer Berlin Heidelberg, 2005, 8 pages.
Kuwata et al., "Three Dimensional Receding Horizon Control for UAVs", AIAA Guidance, Navigation, and Control Conference and Exhibit, Aug. 16-19, 2004, 14 pages.
Alighanbari et al., "Filter-Embedded UAV Task Assignment Algorithms for Dynamic Environments", AIAA Guidance, Navigation, and Control Conference and Exhibit, Aug. 16-19, 2004, 15 pages.

(Continued)

*Primary Examiner* — Gertrude Arthur Jeanglaude

(57) ABSTRACT

A device receives a request for a flight path from a first location to a second location in a region, and calculates the flight path based on the request and based on one or more of weather information, air traffic information, obstacle information, regulatory information, or historical information associated with the region. The device determines required capabilities for the flight path based on the request, and selects, from multiple UAVs, a particular UAV based on the required capabilities for the flight path and based on a ranking of the multiple UAVs. The device generates flight path instructions for the flight path, and provides the flight path instructions to the particular UAV to permit the particular UAV to travel from the first location to the second location via the flight path.

20 Claims, 12 Drawing Sheets

(56) References Cited

OTHER PUBLICATIONS

Saad et al., "Vehicle Swarm Rapid Prototyping Testbed", American Institute of Aeronautics and Astronautics, Aerospace Conference and AIAA Unmanned . . . Unlimited Conference, 2009, 9 pages.

Richards et al., "Decentralized Model Predictive Control of Cooperating UAVs", $43^{rd}$ IEEE Conference on Decision and Control, vol. 4, IEEE, 2004, 6 pages.

Bertuccelli et al., "Robust Planning for Coupled Cooperative UAV Missions", $43^{rd}$ IEEE Conference on Decision and Control, vol. 3, IEEE, 2004, 8 pages.

Toksoz et al., "Automated Battery Swap and Recharge to Enable Persistent UAV Missions", AIAA Infotech@ Aerospace Conference, 2011, 10 pages.

How et al., "Multi-vehicle Experimental Platform for Distributed Coordination and Control", http://web.mit.edu/people/jhow/durip1.html, Apr. 1, 2004, 4 pages.

Chung Tin, "Robust Multi-UAV Planning in Dynamic and Uncertain Environments", Massachusetts Institute of Technology, 2004, 110 pages.

How et al., "Flight Demonstrations of Cooperative Control for UAV Teams", AIAA $3^{rd}$ "Unmanned Unlimited" Technical Conference, Workshop and Exhibit, Sep. 20-23, 2004, 9 pages.

Wikipedia, "Waze", http://en.wikipedia.org/wiki/Waze, Mar. 30, 2014, 6 pages.

Choi et al., "Information deliver scheme of micro UAVs having limited communication range during tracking the moving target" The Journal of Supercomputing, vol. 66, Issue 2, 2013, pp. 950-972.

Boyd et al., "Convex Optimization", Cambridge University Press, 2004, 730 pages.

* cited by examiner

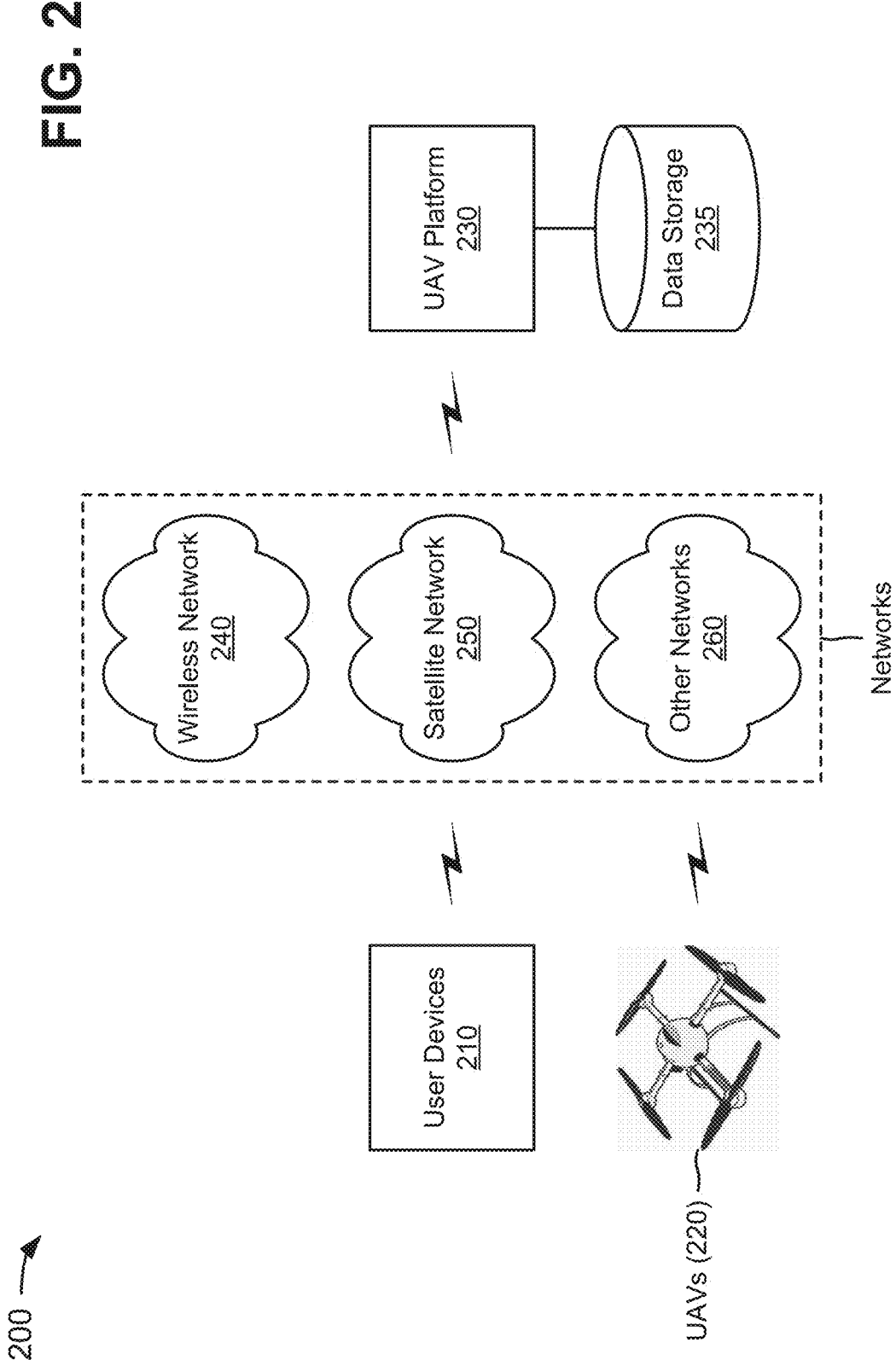

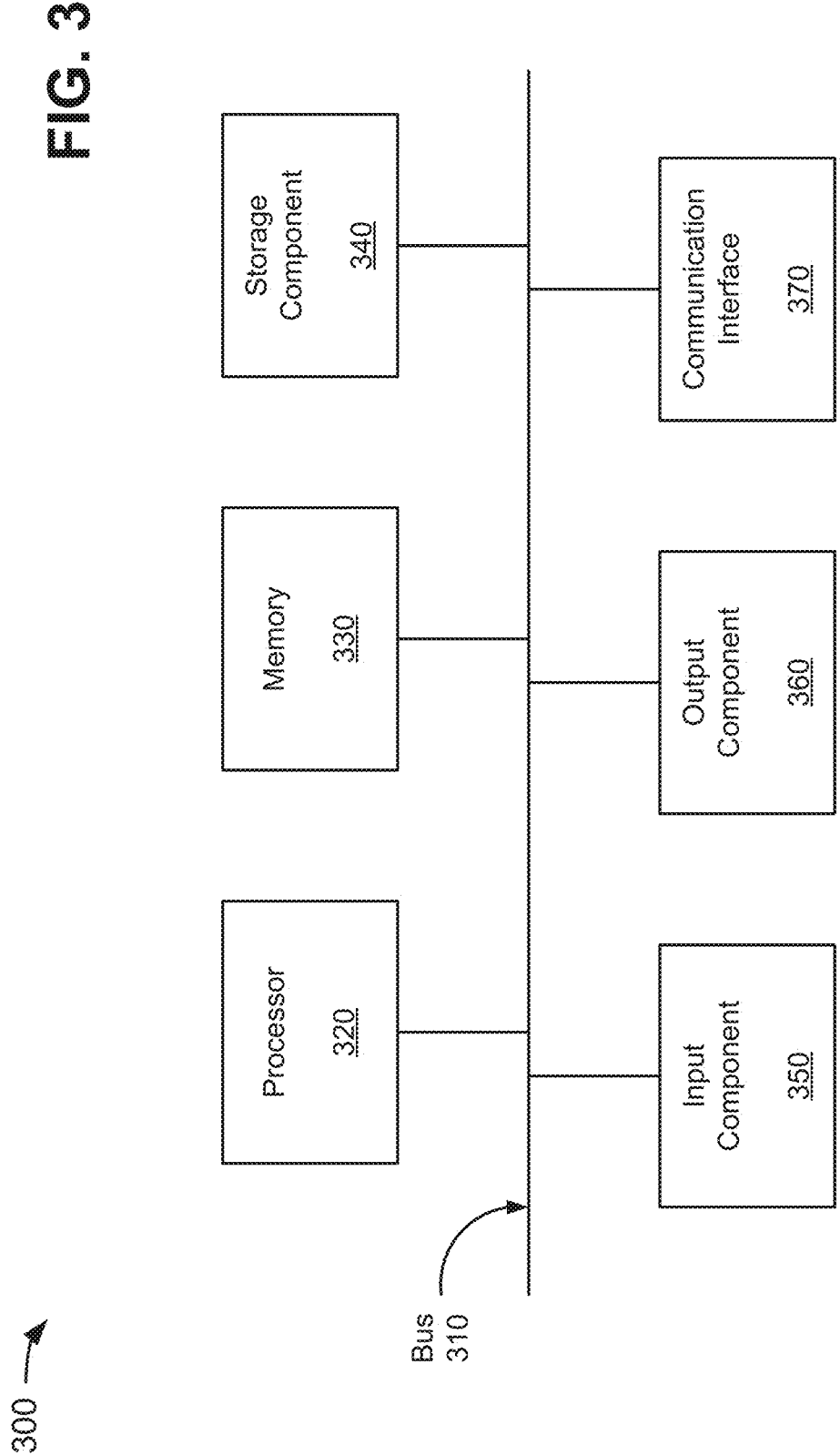

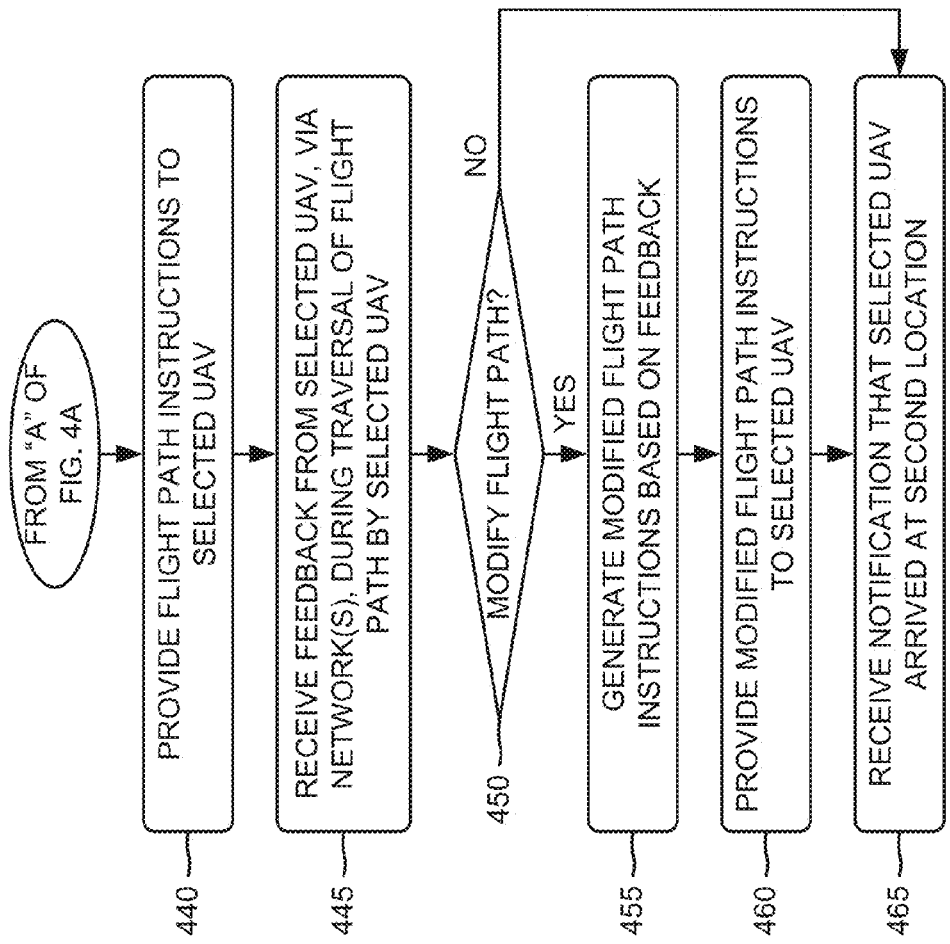

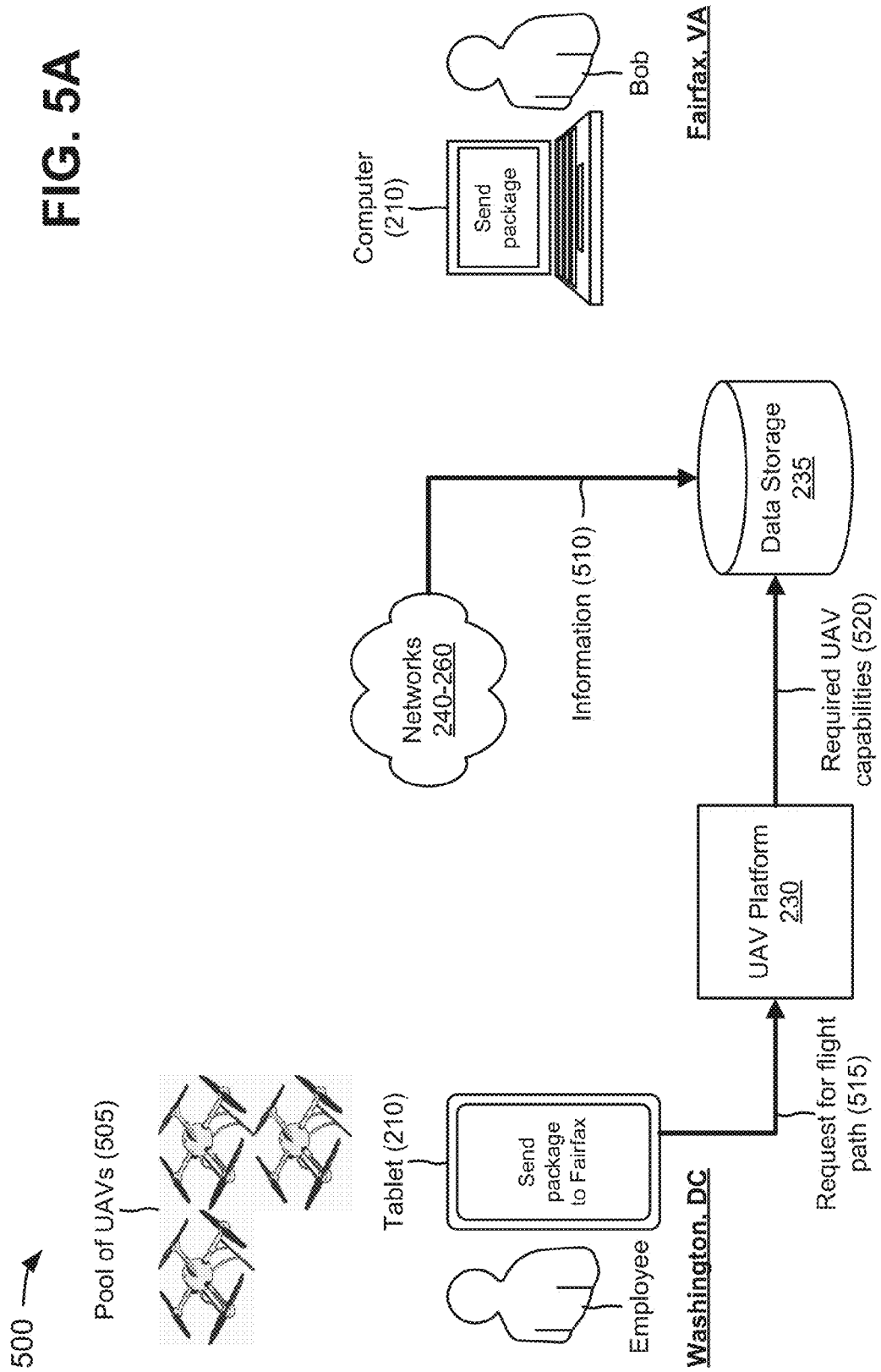

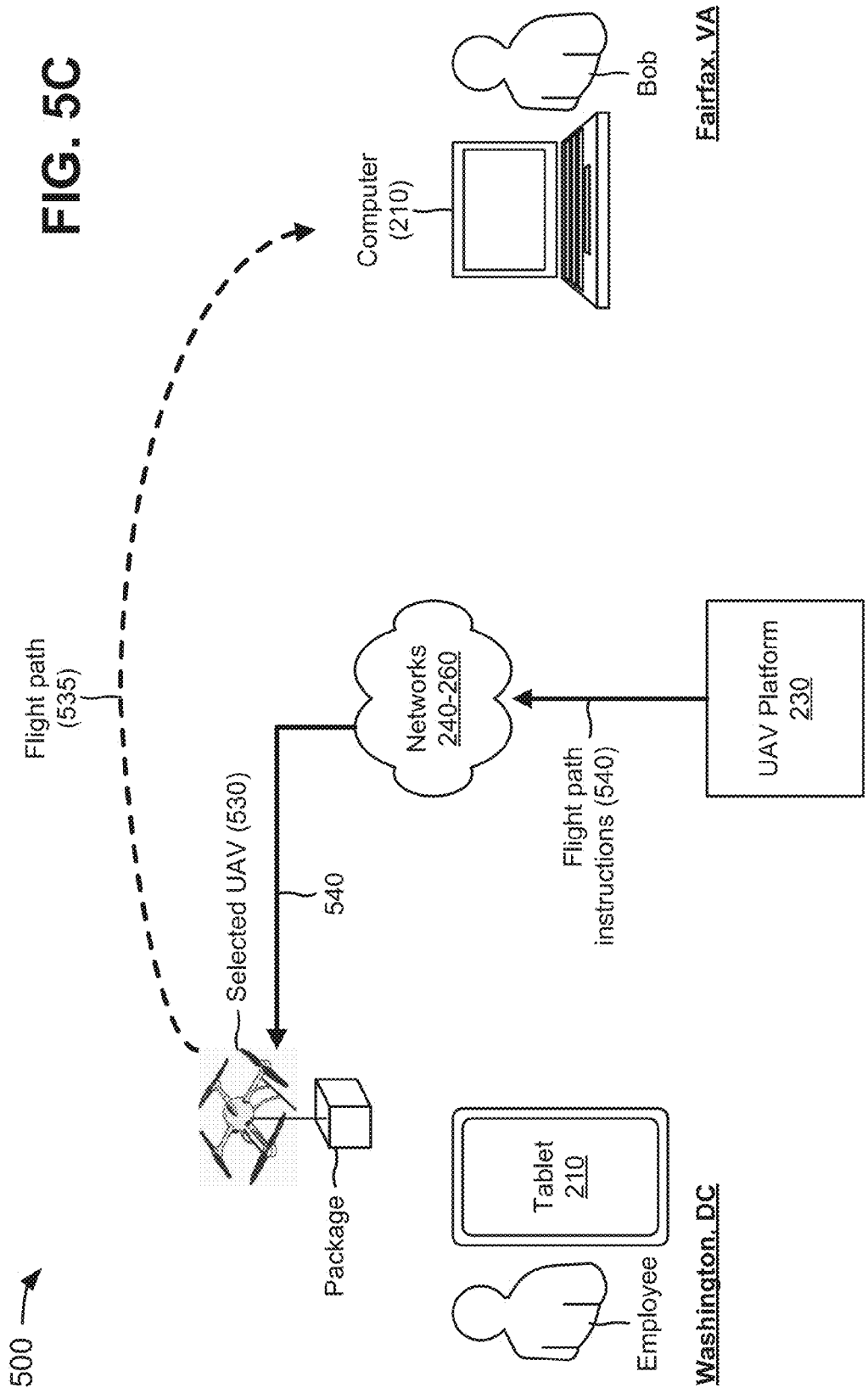

DYNAMIC SELECTION OF UNMANNED AERIAL VEHICLES

BACKGROUND

An unmanned aerial vehicle (UAV) is an aircraft without a human pilot aboard. A UAV's flight may be controlled either autonomously by onboard computers or by remote control of a pilot on the ground or in another vehicle. A UAV is typically launched and recovered via an automatic system or an external operator on the ground. There are a wide variety of UAV shapes, sizes, configurations, characteristics, etc. UAVs may be used for a growing number of civilian applications, such as police surveillance, firefighting, security work (e.g., surveillance of pipelines), surveillance of farms, commercial purposes, etc.

BRIEF DESCRIPTION OF THE DRAWINGS

FIG. 2 is a diagram of an example environment in which systems and/or methods described herein may be implemented;

FIG. 3 is a diagram of example components of one or more devices of FIG. 2;

FIGS. 4A and 4B depict a flow chart of an example process for dynamically selecting a UAV for a flight path; and FIGS. 5A-5F are diagrams of an example relating to the example process shown in FIGS. 4A and 4B.

DETAILED DESCRIPTION OF PREFERRED EMBODIMENTS

The following detailed description refers to the accompanying drawings. The same reference numbers in different drawings may identify the same or similar elements.

Some private companies propose using UAVs for rapid delivery of lightweight commercial products (e.g., packages), food, medicine, etc. Such proposals for UAVs may need to meet various requirements, such as federal and state regulatory approval, public safety, reliability, individual privacy, operator training and certification, security (e.g., hacking), payload thievery, logistical challenges, etc.

Figure 1A:
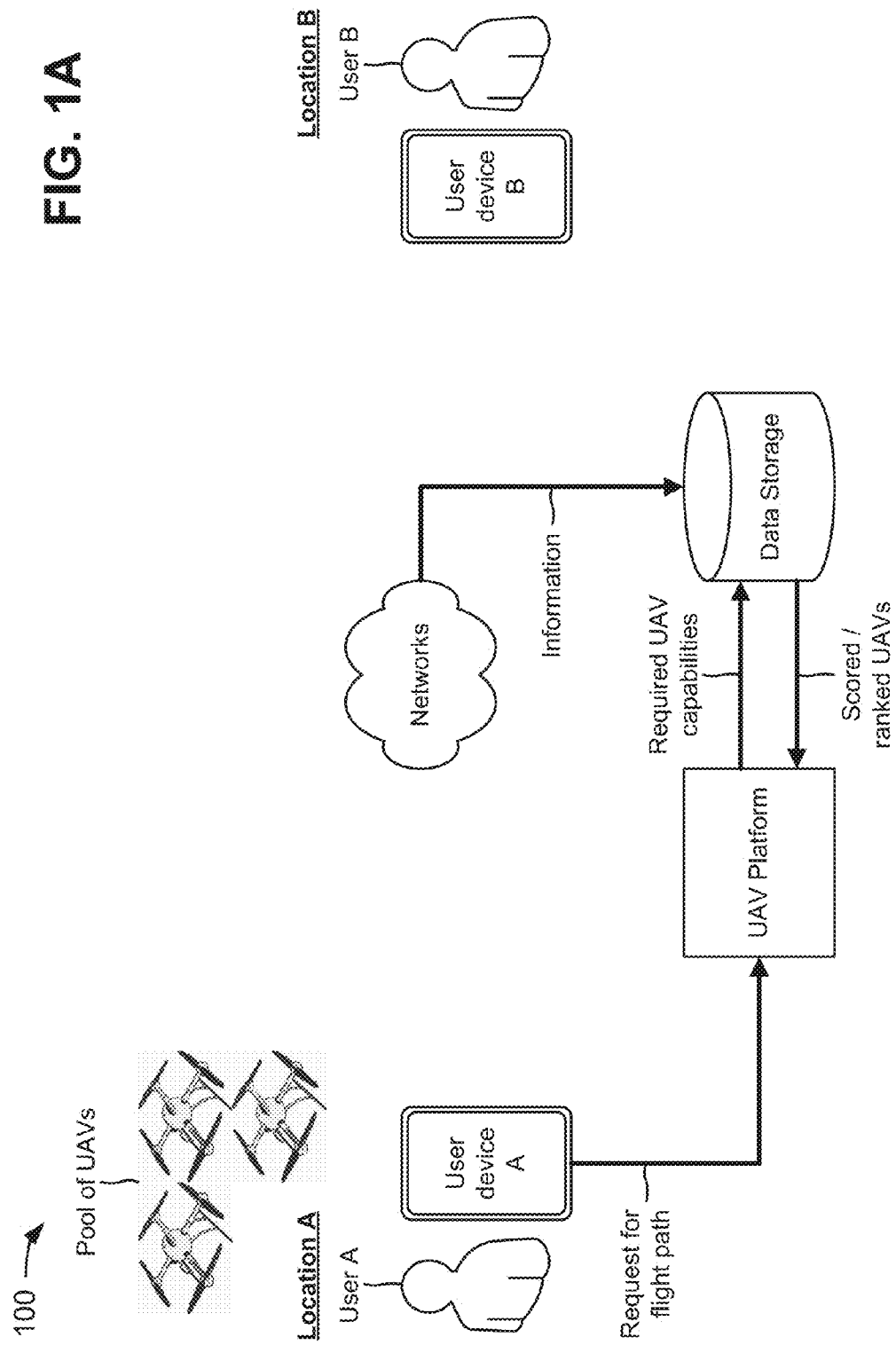
FIGS. 1A and 1B are diagrams of an overview of an example implementation described herein.
Figure 1B:
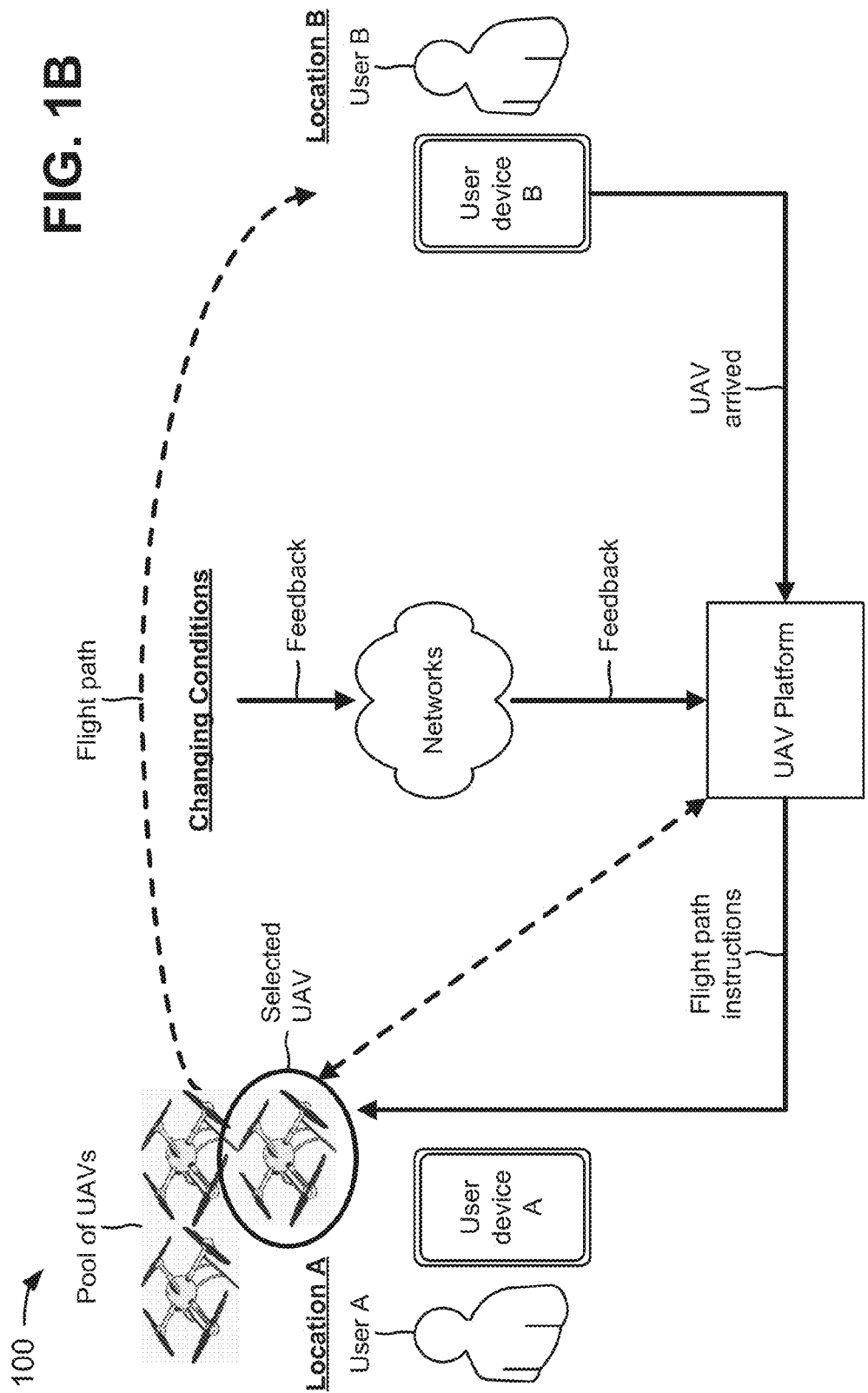

FIGS. 1A and 1B are diagrams of an overview of an example implementation 100 described herein. In example implementation 100, assume that a first user device (e.g., user device A) is associated with a first user (e.g., user A) that is located at an origination location (e.g., location A), as shown in FIG. 1A. Further, assume that user A wants to fly a UAV, selected from a pool or group of UAVs, from location A to a destination location (e.g., location B) in order to deliver a package to a second user (e.g., user B) associated with a second user device (e.g., user device B). As further shown in FIG. 1A, a UAV platform or system may be associated with data storage, and the UAV platform and the data storage may communicate with networks, such as a wireless network, a satellite network, and/or other networks. The networks may provide information to the data storage, such as capability information associated with the UAVs (e.g., thrusts, battery life, etc. associated with the UAVs); weather information associated with a geographical region that includes geographical locations of location A, location B, and locations between location A and location B; air traffic information associated with the geographical region; obstacle information (e.g., buildings, mountains, etc.) associated with the geographical region; regulatory information (e.g., no-fly zones, government buildings, etc.) associated with the geographical region; historical information (e.g., former flight paths, former weather, etc.) associated with the geographical region; etc.

As further shown in FIG. 1A, user A may instruct user device A to generate a request for a flight path (e.g., from location A to location B) for one of the UAVs in the pool, and to provide the request to the UAV platform. The request may include credentials (e.g., serial numbers, identifiers of universal integrated circuit cards (UICCs), etc.) associated with the UAVs in the pool. The UAV platform may utilize the UAV credentials to determine whether the UAVs in the pool are authenticated for utilizing the UAV platform and/or one or more of the networks, and are registered with an appropriate authority (e.g., a government agency) for use. For example, the UAV platform may compare the UAV credentials with UAV account information (e.g., information associated with authenticated and registered UAVs) provided in the data storage to determine whether the UAVs in the pool are authenticated. In example implementation 100, assume that the UAVs in the pool are authenticated by the UAV platform.

The UAV platform may calculate a flight path from location A to location B based on the information (e.g., the weather information, the air traffic information, etc. of the geographical region). As further shown in FIG. 1A, the UAV platform may determine required UAV capabilities for the flight path based on the request for the flight path, and may store the required UAV capabilities in the data storage. Prior to receiving the request for the flight path, the UAV platform may assign different weights to different capability information associated with the pool of UAVs, and may calculate a score for each of the UAVs in the pool based on the capability information and the assigned weights. The UAV platform may rank the UAVs in the pool based on the scores (e.g., in ascending order, descending order, etc.), and may store the scores and the rankings for the pool of UAVs in the data storage. When the required UAV capabilities for the flight path are determined, the UAV platform may retrieve the scores and the rankings for the pool of UAVs from the data storage, as further shown in FIG. 1A.

As shown in FIG. 1B, the UAV platform may select a particular UAV, from the UAVs in the pool, based on the scores and the rankings for the UAVs in the pool and based on the required UAV capabilities for the flight path. After selecting the selected UAV, the UAV platform may generate flight path instructions for the flight path. For example, the flight path instructions may indicate that the selected UAV is to fly at an altitude of two-thousand (2,000) meters, for fifty (50) kilometers and fifty-five (55) minutes, in order to arrive at location B. The UAV platform may provide the flight path instructions to the selected UAV (e.g., via one or more of the networks), as further shown in FIG. 1B.

The selected UAV may take off from location A, and may travel the flight path based on the flight path instructions. While the selected UAV is traversing the flight path, one or more of the networks may receive feedback from the selected UAV regarding the flight path (e.g., about changing conditions, such as speed, weather conditions, duration, etc.). The selected UAV may traverse the flight path until the selected UAV arrives at location B. When the selected UAV arrives at location B, the selected UAV and/or user device B may generate a notification indicating that the selected UAV arrived safely at location B, and may provide the notification to the UAV platform.

Systems and/or methods described herein may provide a platform that enables UAVs to safely traverse flight paths from origination locations to destination locations. The systems and/or methods may enable the platform to determine flight paths for UAVs, and to automatically select optimal UAVs for traversing the determined flight paths, which may increase utilization of the UAVs. The automatic selection of optimal UAVs for traversing the determined flight paths may also reduce costs associated with selecting UAVs for the determined flight paths.

FIG. 2 is a diagram of an example environment 200 in which systems and/or methods described herein may be implemented. As illustrated, environment 200 may include user devices 210, UAVs 220, a UAV platform 230, data storage 235, a wireless network 240, a satellite network 250, and other networks 260. Devices/networks of environment 200 may interconnect via wired connections, wireless connections, or a combination of wired and wireless connections.

User device 210 may include a device that is capable of communicating over wireless network 240 with UAV 220, UAV platform 230, and/or data storage 235. In some implementations, user device 210 may include a radiotelephone; a personal communications services (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a global positioning system (GPS) device; a gaming device; or another type of computation and communication device.

UAV 220 may include an aircraft without a human pilot aboard, and may also be referred to as an unmanned aircraft (UA), a drone, a remotely piloted vehicle (RPV), a remotely piloted aircraft (RPA), or a remotely operated aircraft (ROA). In some implementations, UAV 220 may include a variety of shapes, sizes, configurations, characteristics, etc. for a variety of purposes and applications. In some implementations, UAV 220 may include one or more sensors, such as electromagnetic spectrum sensors (e.g., visual spectrum, infrared, or near infrared cameras, radar systems, etc.); biological sensors; chemical sensors; etc. In some implementations, UAV 220 may utilize one or more of the aforementioned sensors to sense (or detect) and avoid an obstacle in or near a flight path of UAV 220.

In some implementations, UAV 220 may include a particular degree of autonomy based on computational resources provided in UAV 220. For example, UAV 220 may include a low degree of autonomy when UAV 220 has few computational resources. In another example, UAV 220 may include a high degree of autonomy when UAV 220 has more computational resources (e.g., built-in control and/or guidance systems to perform low-level human pilot duties, such as speed and flight-path stabilization, scripted navigation functions, waypoint following, etc.). The computational resources of UAV 220 may combine information from different sensors to detect obstacles on the ground or in the air; communicate with one or more of networks 240-260 and/or other UAVs 220; determine an optimal flight path for UAV 220 based on constraints, such as obstacles or fuel requirements; determine an optimal control maneuver in order to follow a given path or go from one location to another location; regulate a trajectory of UAV 220; etc. In some implementations, UAV 220 may include a variety of components, such as a power source (e.g., an internal combustion engine, an electric battery, a solar-powered battery, etc.); a component that generates aerodynamic lift force (e.g., a rotor, a propeller, a rocket engine, a jet engine, etc.); computational resources; sensors; etc.

UAV platform 230 may include one or more personal computers, one or more workstation computers, one or more server devices, one or more virtual machines (VMs) provided in a cloud computing network, or one or more other types of computation and communication devices. In some implementations, UAV platform 230 may be associated with a service provider that manages and/or operates wireless network 240, satellite network 250, and/or other networks 260, such as, for example, a telecommunication service provider, a television service provider, an Internet service provider, etc.

In some implementations, UAV platform 230 may receive, from user device 210, a request for a flight path from an origination location to a destination location. UAV platform 230 may calculate the flight path from the origination location to the destination location based on other information (e.g., weather information, air traffic information, etc.), and may determine required UAV capabilities for the flight path based on the request for the flight path. UAV platform 230 may assign different weights to different capability information associated with a pool of UAVs 220, and may calculate a score for each UAV 220 in the pool of UAVs 220 based on the capability information and the assigned weights. UAV platform 230 may rank UAVs 220, in the pool of UAVs 200, based on the scores (e.g., in ascending order, descending order, etc.), and may select a particular UAV 220, from the pool of UAVs 220, based on the ranks and based on the required UAV capabilities for the flight path. After selecting the selected UAV 220, UAV platform 230 may generate flight path instructions for the flight path, and may provide the flight path instructions to the selected UAV 220. UAV platform 230 may receive feedback from the selected UAV 220, via networks 240-260, during traversal of the flight path by the selected UAV 220. UAV platform 230 may modify the flight path instructions based on the feedback, and may provide the modified flight path instructions to the selected UAV 220. UAV platform 230 may receive a notification that the selected UAV 220 arrived at the destination location when the selected UAV 220 lands at the destination location.

In some implementations, UAV platform 230 may authenticate one or more users, associated with user device 210 and/or UAV 220, for utilizing UAV platform 230, and may securely store authentication information associated with the one or more users. In some implementations, UAV platform 230 may adhere to requirements to ensure that UAVs 220 safely traverse flight paths, and may limit the flight paths of UAVs 220 to particular safe zones (e.g., particular altitudes, particular geographical locations, particular geo-fencing, etc.) to further ensure safety.

Data storage 235 may include one or more storage devices that store information in one or more data structures, such as databases, tables, lists, trees, etc. In some implementations, data storage 235 may store information, such as UAV account information (e.g., serial numbers, model numbers, user names, etc. associated with UAVs 220); capability information associated with UAVs 220 (e.g., thrust, battery life, etc. associated with UAVs 220); weather information associated with a geographical region (e.g., precipitation amounts, wind conditions, etc.); air traffic information associated with the geographical region (e.g., commercial air traffic, other UAVs 220, etc.); obstacle information (e.g., buildings, mountains, towers etc.) associated with the geographical region; regulatory information (e.g., no-fly zones, government buildings, etc.) associated with the geographical region; historical information (e.g., former flight paths, former weather conditions, etc.) associated with the geographical region; etc. In some implementations, data storage 235 may be included within UAV platform 230.

Wireless network 240 may include a fourth generation (4G) cellular network that includes an evolved packet system (EPS). The EPS may include a radio access network (e.g., referred to as a long term evolution (LTE) network), a wireless core network (e.g., referred to as an evolved packet core (EPC) network), an Internet protocol (IP) multimedia subsystem (IMS) network, and a packet data network (PDN). The LTE network may be referred to as an evolved universal terrestrial radio access network (E-UTRAN), and may include one or more base stations (e.g., cell towers). The EPC network may include an all-Internet protocol (IP) packet-switched core network that supports high-speed wireless and wireline broadband access technologies. The EPC network may allow user devices 210 and/or UAVs 220 to access various services by connecting to the LTE network, an evolved high rate packet data (eHRPD) radio access network (RAN), and/or a wireless local area network (WLAN) RAN. The IMS network may include an architectural framework or network (e.g., a telecommunications network) for delivering IP multimedia services. The PDN may include a communications network that is based on packet switching. In some implementations, wireless network 240 may provide location information (e.g., latitude and longitude coordinates) associated with user devices 210 and/or UAVs 220. For example, wireless network 240 may determine a location of user device 210 and/or UAV 220 based on triangulation of signals, generated by user device 210 and/or UAV 220 and received by multiple cell towers, with prior knowledge of the cell tower locations.

Satellite network 250 may include a space-based satellite navigation system (e.g., a global positioning system (GPS)) that provides location and/or time information in all weather conditions, anywhere on or near the Earth where there is an unobstructed line of sight to four or more satellites (e.g., GPS satellites). In some implementations, satellite network 250 may provide location information (e.g., GPS coordinates) associated with user devices 210 and/or UAVs 220, enable communication with user devices 210 and/or UAVs 220, etc.

Each of other networks 260 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, a cloud computing network, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
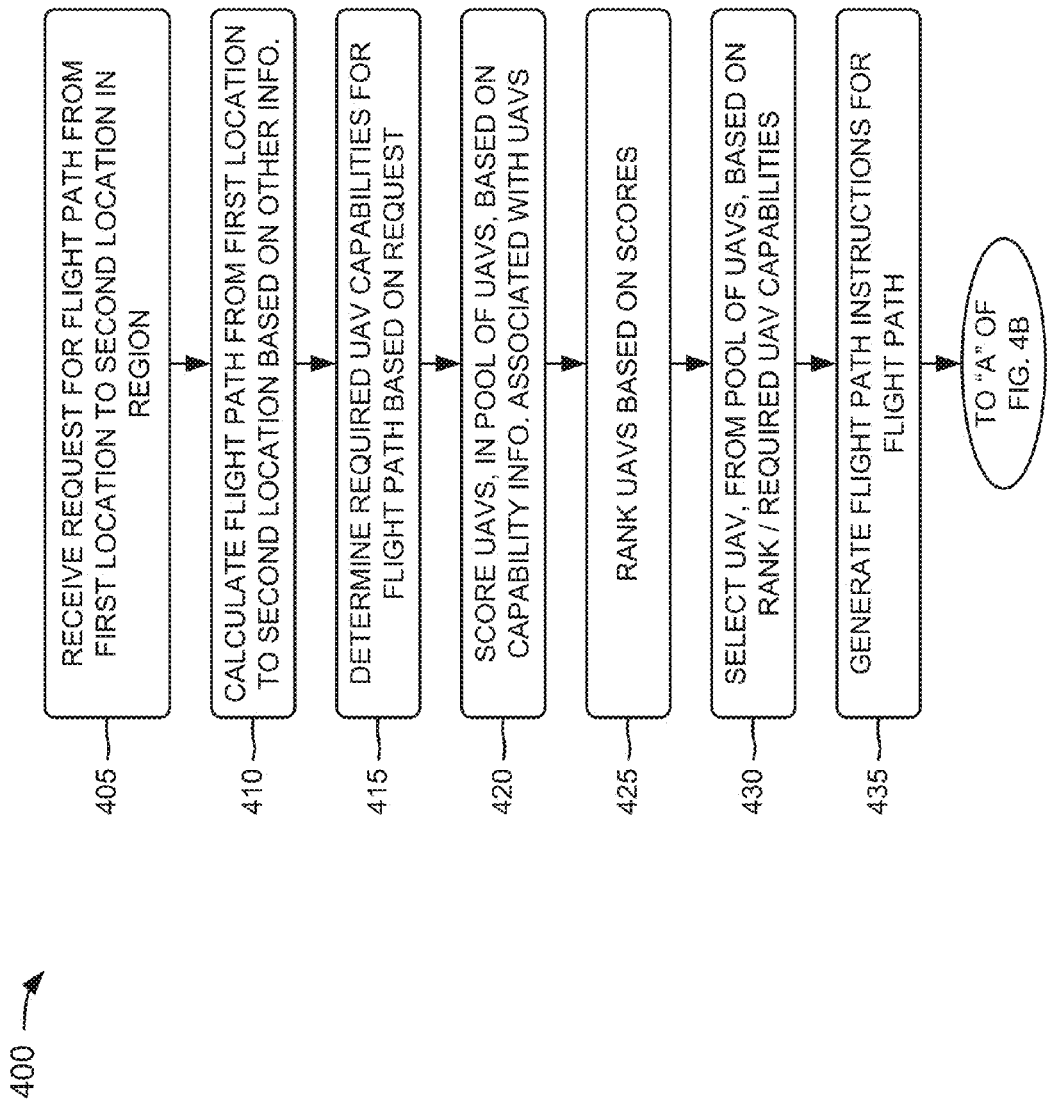

FIGS. 4A and 4B depict a flow chart of an example process 400 for dynamically selecting a UAV for a flight path. In some implementations, one or more process blocks of FIGS. 4A and 4B may be performed by UAV platform 230. In some implementations, one or more process blocks of FIGS. 4A and 4B may be performed by another device or a group of devices separate from or including UAV platform 230, such as user device 210 and/or UAV 220.

As shown in FIG. 4A, process 400 may include receiving a request for a flight path from a first location to a second location in a region (block 405). For example, UAV platform 230 may receive, from user device 210, a request for a flight path from a first location to a second location in a particular region. In some implementations, the request for the flight path may include a request for flight path instructions from an origination location (e.g., a current location of a pool of UAVs 220) to a destination location (e.g., a location in the particular region). The origination location and the destination location may be provided in the particular region. In some implementations, the pool of UAVs 220 may be associated with UAV platform 230 and/or user(s) associated with user device 210. For example, user device 210 and the pool of UAVs 220 may be owned and/or operated by a delivery company, a telecommunication service provider, a television service provider, an Internet service provider, etc.

As further shown in FIG. 4A, process 400 may include calculating the flight path from the first location to the second location based on other information (block 410). For example, UAV platform 230 may calculate the flight path from the origination location to the destination location based on other information. In some implementations, UAV platform 230 may calculate the flight path from the origination location to the destination location based on aviation information associated with the particular region, such as the weather information, the air traffic information, the obstacle information, the regulatory information, the historical information, etc. stored in UAV platform 230 and/or data storage 235. In some implementations, UAV platform 230 may determine whether the other information indicates that UAVs 220 in the pool may safely complete the flight path from the origination location to the destination location without stopping. If UAV platform 230 determines that UAVs 220 in the pool cannot safely complete the flight path from the origination location to the destination location without stopping (e.g., to recharge or refuel), UAV platform 230 may determine one or more waypoints along the flight path for stopping and recharging or refueling.

In some implementations, UAV platform 230 may calculate the flight path based on the weather information. For example, UAV platform 230 may determine that, without weather issues, the flight path may take any UAV 220 two hours to complete at an altitude of five-hundred meters. UAV platform 230 may further determine that wind conditions at five-hundred meters may create a headwind of fifty kilometers per hour on any UAV 220, but that wind conditions at one-thousand meters may create a tailwind of fifty kilometers per hour on any UAV 220. In such an example, UAV platform 230 may alter the flight path from an altitude of five-hundred meters to an altitude of one-thousand meters (e.g., if any UAV 220 is capable of reaching the altitude of one-thousand meters). Assume that the tailwind at the altitude of one-thousand meters decreases the flight time from two hours to one hour and thirty minutes. Alternatively, UAV platform 230 may not alter the flight path, but the headwind at the altitude of five-hundred meters may increase the flight time from two hours to two hours and thirty minutes.

Additionally, or alternatively, UAV platform 230 may calculate the flight path based on the air traffic information. For example, UAV platform 230 may determine that, without air traffic issues, the flight path may take any UAV 220 two hours to complete at an altitude of five-hundred meters. UAV platform 230 may further determine that other UAVs 220 are flying at the altitude of five-hundred meters based on the air traffic information, but that no other UAVs 220 are flying at an altitude of one-thousand meters. In such an example, UAV platform 230 may alter the flight path from an altitude of five-hundred meters to an altitude of one-thousand meters. The altitude of one-thousand meters may enable any UAV 220 to safely arrive at the location without the possibility of colliding with the other UAVs 220. Alternatively, UAV platform 230 may not alter the flight path, but the other UAVs 220 flying at the altitude of five-hundred meters may increase the possibility that any UAV 220 may collide with another UAV 220. UAV platform 230 may then determine whether any UAV 220 is capable of safely flying at the altitude of five-hundred meters without colliding with another UAV 220.

Additionally, or alternatively, UAV platform 230 may calculate the flight path based on the obstacle information. For example, UAV platform 230 may determine that, without obstacle issues, the flight path may take any UAV 220 one hour to complete at an altitude of two-hundred meters. UAV platform 230 may further determine that one or more buildings are two-hundred meters in height based on the obstacle information, but that no other obstacles are greater than two-hundred meters in height. In such an example, UAV platform 230 may alter the flight path from an altitude of two-hundred meters to an altitude of three-hundred meters. The altitude of three-hundred meters may enable any UAV 220 to safely arrive at the location without the possibility of colliding with the one or more buildings. Alternatively, UAV platform 230 may not alter the altitude of the flight path, but may change the flight path to avoid the one or more buildings, which may increase the flight time from one hour to one hour and thirty minutes.

Additionally, or alternatively, UAV platform 230 may calculate the flight path based on the regulatory information. For example, UAV platform 230 may determine that, without regulatory issues, the flight path may take any UAV 220 one hour to complete at an altitude of five-hundred meters. UAV platform 230 may further determine that the flight path travels over a restricted facility based on the regulatory information. In such an example, UAV platform 230 may change the flight path to avoid flying over the restricted facility, which may increase the flight time from one hour to one hour and thirty minutes.

Additionally, or alternatively, UAV platform 230 may calculate the flight path based on the historical information. For example, UAV platform 230 may identify prior flight paths from the origination location to the destination location from the historical information, and may select one of the prior flight paths, as the flight path. For example, assume that UAV platform 230 identifies three prior flight paths that include flight times of two hours, three hours, and four hours, respectively. In such an example, UAV platform 230 may select, as the flight path, the prior flight path with the flight time of two hours.

As further shown in FIG. 4A, process 400 may include determining required UAV capabilities for the flight path based on the request for the flight path (block 415). For example, UAV platform 230 may determine required UAV capabilities for executing the flight path based on the request for the flight path. In some implementations, UAV platform 230 may determine the required UAV capabilities based on the origination location, the destination location, and/or the particular region associated with the flight path. For example, UAV platform 230 may determine that the flight path requires UAV 220 to be available and located at or near the origination location, able to travel non-stop to the destination location (e.g., located twenty kilometers from the origination location), able to travel in the particular region, etc. In such an example, UAV platform 230 may determine that a UAV 220 capable of flying ten kilometers non-stop does not satisfy the required UAV capabilities (e.g., since the destination location is located twenty kilometers from the origination location), but that a UAV 220 capable of flying thirty kilometers non-stop satisfies the required UAV capabilities.

In some implementations, UAV platform 230 may determine the required UAV capabilities based on physical requirements (e.g., payload capacity, battery life, non-stop flying distance, etc. associated with UAV 220) associated with the flight path. For example, UAV platform 230 may determine that the flight path requires a UAV 220 that is capable of carrying a payload that weighs ten kilograms for a distance of twenty kilometers non-stop. In such an example, UAV platform 230 may determine that a UAV 220 capable of carrying payloads that weigh less than five kilograms for a distance of ten kilometers non-stop does not satisfy the required UAV capabilities. However, UAV platform 230 may determine that a UAV 220 capable of carrying payloads that weigh twenty kilograms for a distance of thirty kilometers non-stop satisfies the required UAV capabilities.

In some implementations, UAV platform 230 may determine the required UAV capabilities based on component requirements (e.g., sensors, network generating components, etc. of UAV 220) associated with the flight path. For example, UAV platform 230 may determine that the flight path requires a UAV 220 that is capable of recording video images along the flight path. In such an example, UAV platform 230 may determine that a UAV 220 without a video camera does not satisfy the required UAV capabilities, but that a UAV 220 with a video camera satisfies the required UAV capabilities. In another example, UAV platform 230 may determine that the flight path requires a UAV 220 that is capable of generating a wireless network hotspot (e.g., a mobile hotspot) along the flight path. In such an example, UAV platform 230 may determine that a UAV 220 without a mobile hotspot component does not satisfy the required UAV capabilities, but that a UAV 220 with a mobile hotspot component satisfies the required UAV capabilities.

In some implementations, UAV platform 230 may determine the required UAV capabilities based on the aviation information associated with the particular region, such as the weather information, the air traffic information, the obstacle information, the regulatory information, the historical information, etc. associated with the particular region. For example, assume that the weather information indicates that the flight path requires traveling through a particular headwind of twenty kilometers per hour. In such an example, UAV platform 230 may determine that the flight path requires a UAV 220 that is capable of withstanding the particular headwind. In another example, assume that the air traffic information indicates that the flight path requires traveling at a particular altitude of one kilometer to avoid other air traffic. In such an example, UAV platform 230 may determine that the flight path requires a UAV 220 that is capable of traveling at the particular altitude.

As further shown in FIG. 4A, process 400 may include scoring UAVs, in a pool of UAVs, based on capability information associated with the UAVs (block 420). For example, UAV platform 230 may retrieve, from data storage 235, capability information for UAVs 220 in the pool of UAVs 220. In some implementations, data storage 235 may include capability information associated with different components of UAVs 220, such as battery life, thrusts provided by rotors, flight times associated with amounts of fuel, etc. In some implementations, UAV platform 230 may utilize component information of UAVs 220 in the pool (e.g., indicating that UAVs 220 in the pool have particular types of batteries, engines, rotors, etc.) to retrieve the capability information for components of UAVs 220 in the pool from data storage 235. For example, if a particular UAV 220 in the pool has a particular type of battery and a particular type of rotor, UAV platform 230 may determine that the particular type of battery of the particular UAV 220 may provide two hours of flight time and that the particular type of rotor may enable the particular UAV 220 to reach an altitude of one-thousand meters.

In some implementations, UAV platform 230 may assign different weights to different capability information associated with UAVs 220 in the pool. In some implementations, UAV platform 230 may calculate a score for each of UAVs 220 in the pool based on the capability information and the assigned weights. For example, assume that UAV platform 230 assigns a weight of 0.1 to battery lives of UAVs 220 in the pool, a weight of 0.2 to rotor thrusts of UAVs 220 in the pool, and a weight of 0.5 to the sense and avoid capabilities of UAVs 220 in the pool. Further, assume that UAV platform 230 calculates a score of 0.4 for a first UAV 220 in the pool, a score of 0.7 for a second UAV 220 in the pool, and a score of 0.5 for a third UAV 220 in the pool.

As further shown in FIG. 4A, process 400 may include ranking the UAVS, in the pool of UAVs, based on the scores (block 425). For example, UAV platform 230 may rank each UAV 220 in the pool based on a score calculated for each UAV 220 in the pool. In some implementations, UAV platform 230 may rank UAVs 220 in the pool based on the scores in ascending order, descending order, etc. For example, assume that UAV platform 230 calculates a score of 0.4 for a first UAV 220 in the pool, a score of 0.7 for a second UAV 220 in the pool, and a score of 0.5 for a third UAV 220 in the pool. UAV platform 230 may rank UAVs 220 in the pool based on the scores (e.g., as (1) the second UAV 220, (2) the third UAV 220, and (3) the first UAV 220).

As further shown in FIG. 4A, process 400 may include selecting a particular UAV, from the pool of UAVs, based on the rank and the required UAV capabilities (block 430). For example, UAV platform 230 may select a particular UAV 220, from the pool of UAVs 220, based on the rank associated with UAVs 220 in the pool and/or the required UAV capabilities. In some implementations, UAV platform 230 may select, as the particular UAV 220, a UAV 220 with a greatest ranking. For example, assume that UAV platform 230 calculates a score of 0.4 for a first UAV 220 in the pool, a score of 0.7 for a second UAV 220 in the pool, and a score of 0.5 for a third UAV 220 in the pool. UAV platform 230 may rank UAVs 220 in the pool based on the scores (e.g., as (1) the second UAV 220, (2) the third UAV 220, and (3) the first UAV 220), and may select the second UAV 220 as the particular UAV 220 to traverse the flight path based on the ranking, since the second UAV 220 has the greatest score.

Additionally, or alternatively, UAV platform 230 may select the particular UAV 220, from the pool of UAVs 220, based on the required UAV capabilities. For example, UAV platform 230 may select the particular UAV 220, from UAVs 220 in the pool, when the particular UAV 220 is capable of flying a distance associated with the flight path, in weather conditions (e.g., specified by the weather information), without colliding with air traffic and/or obstacles (e.g., specified by the air traffic information and the obstacle information), and without violating any regulations (e.g., specified by the regulatory information). In some implementations, UAV platform 230 may determine that multiple UAVs 220, from UAVs 220 in the pool, satisfy the required UAV capabilities, and may select, as the particular UAV 220, one of the multiple UAVs 220 that is capable of traversing the flight path in the most efficient manner (e.g., in a shortest distance, in a shortest amount of time, using the least amount of resources, etc.).

As further shown in FIG. 4A, process 400 may include generating flight path instructions for the flight path (block 435). For example, UAV platform 230 may generate flight path instructions for the flight path. In some implementations, the flight path instructions may include specific altitudes for the selected UAV 220 between fixed geographic coordinates (e.g., a first location and a second location); navigational information (e.g., travel east for three kilometers, then north for two kilometers, etc.); expected weather conditions (e.g., headwinds, tailwinds, temperatures, etc.); network information (e.g., locations of base stations of wireless network 240); timing information (e.g., when to take off, when to perform certain navigational maneuvers, etc.); waypoint information (e.g., locations where the selected UAV 220 may stop and recharge or refuel); etc. For example, the flight path instructions may include information that instructs the selected UAV 220 to fly forty-five degrees northeast for ten kilometers and at an altitude of five-hundred meters, then fly three-hundred and fifteen degrees northwest for ten kilometers and at an altitude of four-hundred meters, etc.

As shown in FIG. 4B, process 400 may include providing the flight path instructions to the selected UAV (block 440). For example, UAV platform 230 may provide the flight path instructions to the selected UAV 220. In some implementations, the selected UAV 220 may utilize the flight path instructions to travel via the flight path. For example, the selected UAV 220 may take off at a time specified by the flight path instructions, may travel a route and at altitudes specified by the flight path instructions, may detect and avoid any obstacles encountered in the flight path, etc. until the selected UAV 220 arrives at the destination location.

In some implementations, if the selected UAV 220 includes sufficient computational resources (e.g., a sufficient degree of autonomy), the selected UAV 220 may utilize information provided by the flight path instructions to calculate a flight path for the selected UAV 220 and to generate flight path instructions. In such implementations, the flight path instructions provided by UAV platform 230 may include less detailed information, and the selected UAV 220 may determine more detailed flight path instructions via the computational resources of the selected UAV 220.

As further shown in FIG. 4B, process 400 may include receiving feedback from the selected UAV, via network(s), during traversal of the flight path by the selected UAV (block 445). For example, while the selected UAV 220 is traveling along the flight path in accordance with the flight path instructions, the selected UAV 220 may provide feedback to UAV platform 230 via one or more of networks 240-260, and UAV platform 230 may receive the feedback. In some implementations, the feedback may include information received by sensors of the selected UAV 220, such as visual information received from electromagnetic spectrum sensors of the selected UAV 220 (e.g., images of obstacles), temperature information, wind conditions, etc. In some implementations, the selected UAV 220 may utilize such feedback to detect and avoid any unexpected obstacles encountered by the selected UAV 220 during traversal of the flight path. For example, if the selected UAV 220 detects another UAV 220 in the flight path, the selected UAV 220 may alter the flight path to avoid colliding with the other UAV 220.

As further shown in FIG. 4B, process 400 may include determining whether to modify the flight path based on the feedback from the selected UAV (block 450). For example, UAV platform 230 may determine whether to modify the flight path based on the feedback received from the selected UAV 220. In some implementations, UAV platform 230 may determine to not modify the flight path if the feedback indicates that the selected UAV 220 will safely arrive at the destination location. In some implementations, UAV platform 230 may determine to modify the flight path if the feedback indicates that the selected UAV 220 is in danger of colliding with an obstacle (e.g., another UAV 220, a building, an airplane, etc.). In such implementations, UAV platform 230 may modify the flight path so that the selected UAV 220 avoids colliding with the obstacle and/or remains a safe distance from the obstacle.

In some implementations, UAV platform 230 may determine to modify the flight path if the feedback indicates that the weather conditions may prevent the selected UAV 220 from reaching the destination location. For example, the wind conditions may change and cause the flight time of the selected UAV 220 to increase to a point where the battery of the selected UAV 220 will be depleted before the selected UAV 220 reaches the destination location. In such an example, UAV platform 230 may modify the flight path so that the selected UAV 220 either stops to recharge or changes altitude to improve wind conditions. In another example, rain or ice may increase the weight of the selected UAV 220 and/or its payload and may cause the battery of the selected UAV 220 to work harder to a point where the battery of the selected UAV 220 will be depleted before the selected UAV 220 reaches the destination location. In such an example, UAV platform 230 may modify the flight path so that the selected UAV 220 stops to recharge before completing the flight path.

As further shown in FIG. 4B, if the flight path is to be modified (block 450—YES), process 400 may include generating modified flight path instructions based on the feedback (block 455). For example, if UAV platform 230 determines that the flight path is be modified, UAV platform 230 may modify the flight path based on the feedback (e.g., as described above). In some implementations, UAV platform 230 may generate modified flight path instructions for the modified flight path based on the feedback. In some implementations, the modified flight path instructions may include the features of flight path instructions, but may be modified based on the feedback. For example, the flight path instructions may be modified so that the selected UAV 220 avoids colliding with an obstacle and/or remains a safe distance from the obstacle, stops to recharge, changes altitude to improve wind conditions, etc.

As further shown in FIG. 4B, process 400 may include providing the modified flight path instructions to the selected UAV (block 460). For example, UAV platform 230 may provide the modified flight path instructions to the selected UAV 220. In some implementations, the selected UAV 220 may utilize the modified flight path instructions to travel along the modified flight path. For example, the selected UAV 220 may adjust a route and altitudes according to the modified flight path instructions, may detect and avoid any obstacles encountered in the modified flight path, etc. until the selected UAV 220 arrives at the destination location. In some implementations, the selected UAV 220 may continue to provide further feedback to UAV platform 230 during traversal of the modified flight path, and UAV platform 230 may or may not further modify the flight path based on the further feedback.

As further shown in FIG. 4B, if the flight path is not to be modified (block 450—NO), process 400 may include receiving a notification that the selected UAV arrived at the second location (block 465). For example, if the feedback indicates that the selected UAV 220 will safely arrive at the destination location, UAV platform 230 may determine that the flight path need not be modified. In some implementations, the selected UAV 220 may continue along the flight path based on the flight path instructions until the selected UAV 220 arrives at the destination location. When the selected UAV 220 arrives at the destination location, the selected UAV 220 may provide a notification to UAV platform 230, via one or more of networks 240-260. In some implementations, the notification may indicate that the selected UAV 220 has safely arrived at the destination location.

Although FIGS. 4A and 4B shows example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Figure 5B:
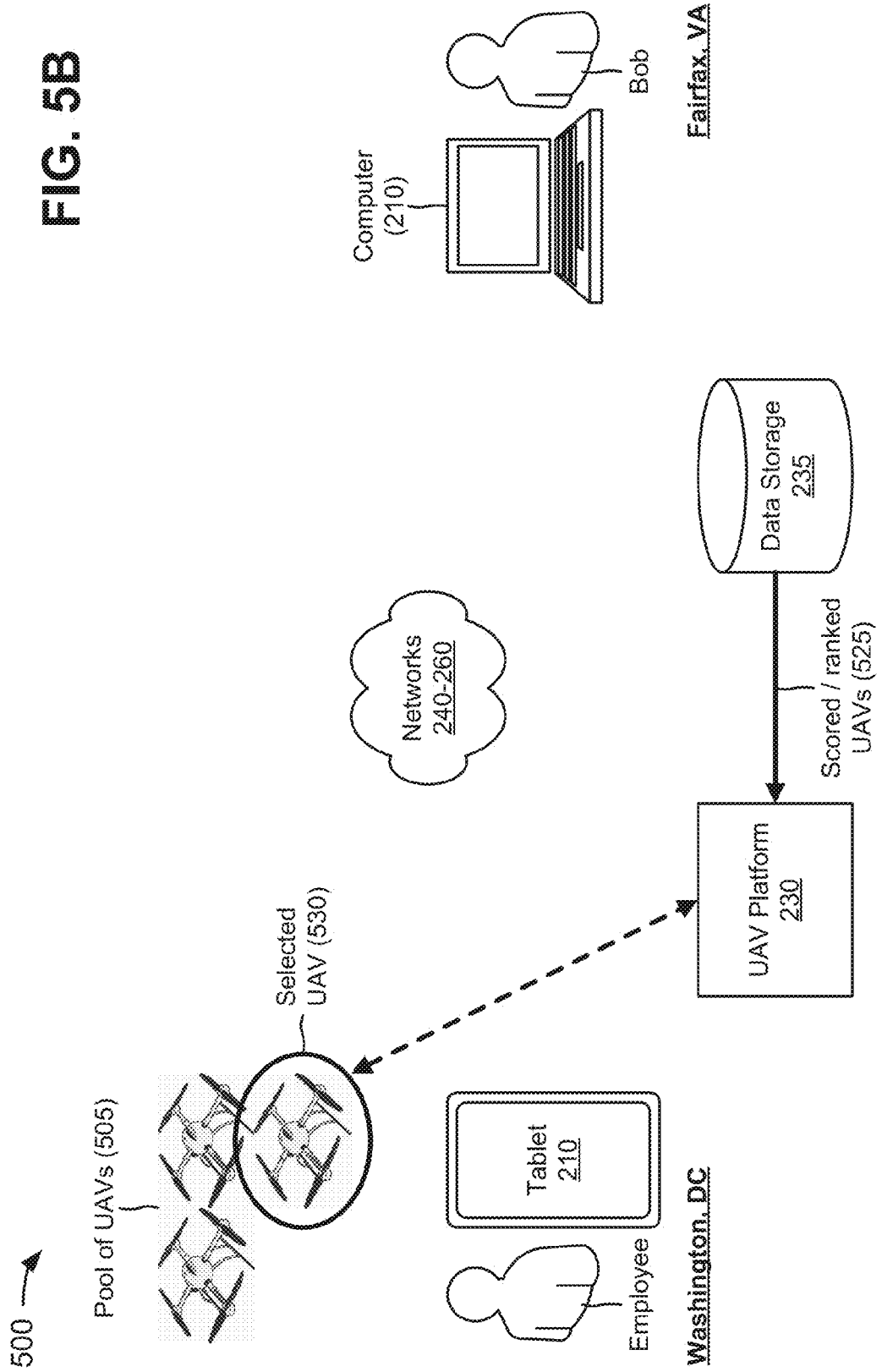

FIGS. 5A-5F are diagrams of an example 500 relating to example process 400 shown in FIGS. 4A and 4B. Assume that a first user device 210 (e.g., a tablet 210) is associated with a first user (e.g., an employee at a delivery company) that is located at an origination location (e.g., Washington, D.C.), as shown in FIG. 5A. Further, assume that a second user device 210 (e.g., a computer 210) is associated with a second user (e.g., Bob) that is located at a destination location (e.g., Fairfax, Va.), and that Bob has instructed computer 210 to request delivery of a package to Fairfax, Va. For example, computer 210 may inform tablet 210 (e.g., via one or more servers associated with the delivery company) and the employee that the package is to be delivered to Bob as soon as possible. Further, assume that the employee wants to utilize one UAV 220, from a pool 505 of UAVs 220, to fly the package from Washington, D.C. to Fairfax, Va. in order to deliver the package to Bob.

As further shown in FIG. 5A, UAV platform 230 and data storage 235 may communicate with wireless network 240, satellite network 250, and/or other networks 260. One or more of networks 240-260 may provide, to data storage 235, information 510, such as capability information associated with UAVs 220 in pool 505, weather information associated with a geographical region (e.g., that includes a geographical location of Washington, D.C., a geographical location of Fairfax, Va., and geographical locations between Washington and Fairfax), air traffic information associated with the geographical region, obstacle information associated with the geographical region, regulatory information associated with the geographical region, historical information associated with the geographical region, etc.

As further shown in FIG. 5A, the employee may instruct tablet 210 to generate a request 515 for a flight path (e.g., from Washington, D.C. to Fairfax, Va.) for one of UAVs 220 in pool 505, and to provide request 515 to UAV platform 230. Request 515 may include credentials (e.g., serial numbers, identifiers of UICCs, etc.) associated with UAVs 220 in pool 505, or the credentials may be provided separately from request 515 to UAV platform 230. UAV platform 230 may utilize the credentials to determine whether one or more UAVs 220 in pool 505 are authenticated for utilizing UAV platform 230 and/or one or more of networks 240-260, and are registered with an appropriate authority for use. For example, UAV platform 230 may compare the credentials with information provided in data storage 235 in order to determine whether one or more UAVs 220 in pool 505 are authenticated for utilizing UAV platform 230 and/or one or more of networks 240-260, and are registered with an appropriate authority. Assume that all UAVs 220 in pool 505 are authenticated and/or registered.

UAV platform 230 may calculate a flight path from Washington, D.C. to Fairfax, Va. based on information 510 (e.g., weather information, air traffic information, obstacle information, regulatory information, historical information, etc.) provided in data storage 235. For example, assume that the weather information indicates that the wind is ten kilometers per hour from the west and that it is raining; the air traffic information indicates that a jet is at an altitude of ten-thousand meters and another UAV 220 is at an altitude of five-hundred meters; the obstacle information indicates that a mountain is two kilometers in height and a building is five-hundred meters in height; the regulatory information indicates that there is a no-fly zone over a government building; and the historical information indicates that a historical flight path had a duration of thirty minutes and an altitude of one-thousand meters. UAV platform 230 may calculate the flight path from Washington, D.C. to Fairfax, Va. based on such information.

As further shown in FIG. 5A, UAV platform 230 may determine required UAV capabilities 520 for the requested flight based on request 515. For example, UAV platform 230 may determine that required UAV capabilities 520 include flying a package that weighs ten kilograms from Washington, D.C. to Fairfax, Va. non-stop. UAV platform 230 may provide required UAV capabilities 520 to data storage 235 (e.g., for storage).

UAV platform 230 may assign different weights to different capability information associated with UAVs 220 in pool 505, and may calculate a score for each UAV 220 in pool 505 based on the assigned weights. UAV platform 230 may rank UAVs 220 in pool 505 based on the scores, and may provide the ranking and the scores of UAVs 220 in pool 550 to data storage 235 (e.g., for storage). UAV platform 230 may retrieve the ranking and the scores of UAVs 220 in pool 550 from data storage 235, as indicated by reference number 525 in FIG. 5B. UAV platform 230 may select a particular UAV 220 (e.g., referred to as selected UAV 530 in FIG. 5B), from UAVs 220 in pool 505, based on the ranking and/or based on required UAV capabilities 520. Selected UAV 530 may be capable of flying a package that weighs ten kilograms from Washington, D.C. to Fairfax, Va. non-stop.

The calculated flight path from Washington, D.C. to Fairfax, Va. may be depicted by reference number 535 in FIG. 5C. As further shown in FIG. 5C, UAV platform 230 may generate flight path instructions 540 for flight path 535. Flight path instructions 540 may include, for example, information instructing the selected UAV 530 to fly north at zero degrees for ten kilometers, then northeast at forty degrees for three kilometers, at an altitude of one-thousand meters, etc. UAV platform 230 may provide flight path instructions 540 to the selected UAV 530 via one or more of networks 240-260. The package may be attached to or provided in the selected UAV 530 (e.g., by the employee). The selected UAV 530 may take off from Washington, D.C. with the package, and may travel flight path 535 based on flight path instructions 540.

Figure 5D:
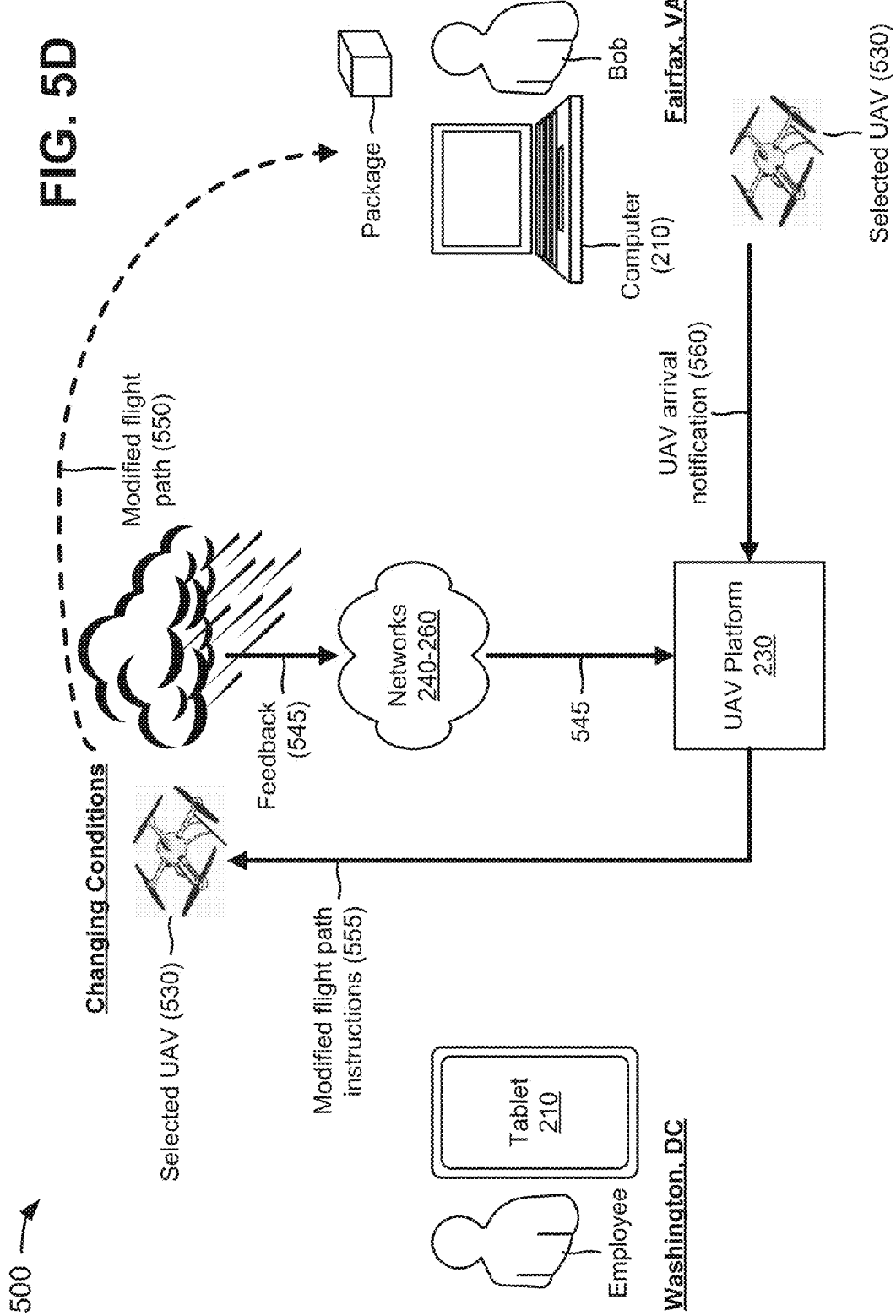

While the selected UAV 530 is traveling along flight path 535, one or more of networks 240-260 may receive feedback 545 from the selected UAV 530 regarding traversal of flight path 535 by the selected UAV 530 (e.g., changing conditions, such as speed, weather conditions, duration, etc.), as shown in FIG. 5D. Assume that the selected UAV 530 senses bad weather (e.g., heavy rain) along flight path 535, and provides information about the bad weather to UAV platform 230 (e.g., via feedback 545). UAV platform 230 and/or the selected UAV 530 may calculate a modified flight path 550 that enables the selected UAV 530 to avoid and/or remain a safe distance from the bad weather. UAV platform 230 and/or the selected UAV 530 may generate modified flight path instructions 555 for modified flight path 550. UAV platform 230 may provide modified flight path instructions 555 to selected UAV 530 (e.g., via one or more of networks 240-260), and the selected UAV 530 may travel modified flight path 550, based on modified flight path instructions 555, until the selected UAV 530 arrives at Fairfax, Va.

As further shown in FIG. 5D, when the selected UAV 530 arrives at Fairfax, Va., the selected UAV 530 may leave the package at a location where Bob may retrieve the package. The selected UAV 530 and/or computer 210 (e.g., via Bob's input or detection of the presence of the selected UAV 530) may generate a notification 560 indicating that the selected UAV 530 and the package arrived safely at a particular location in Fairfax, Va., and may provide notification 560 to UAV platform 230.

Figure 5E:
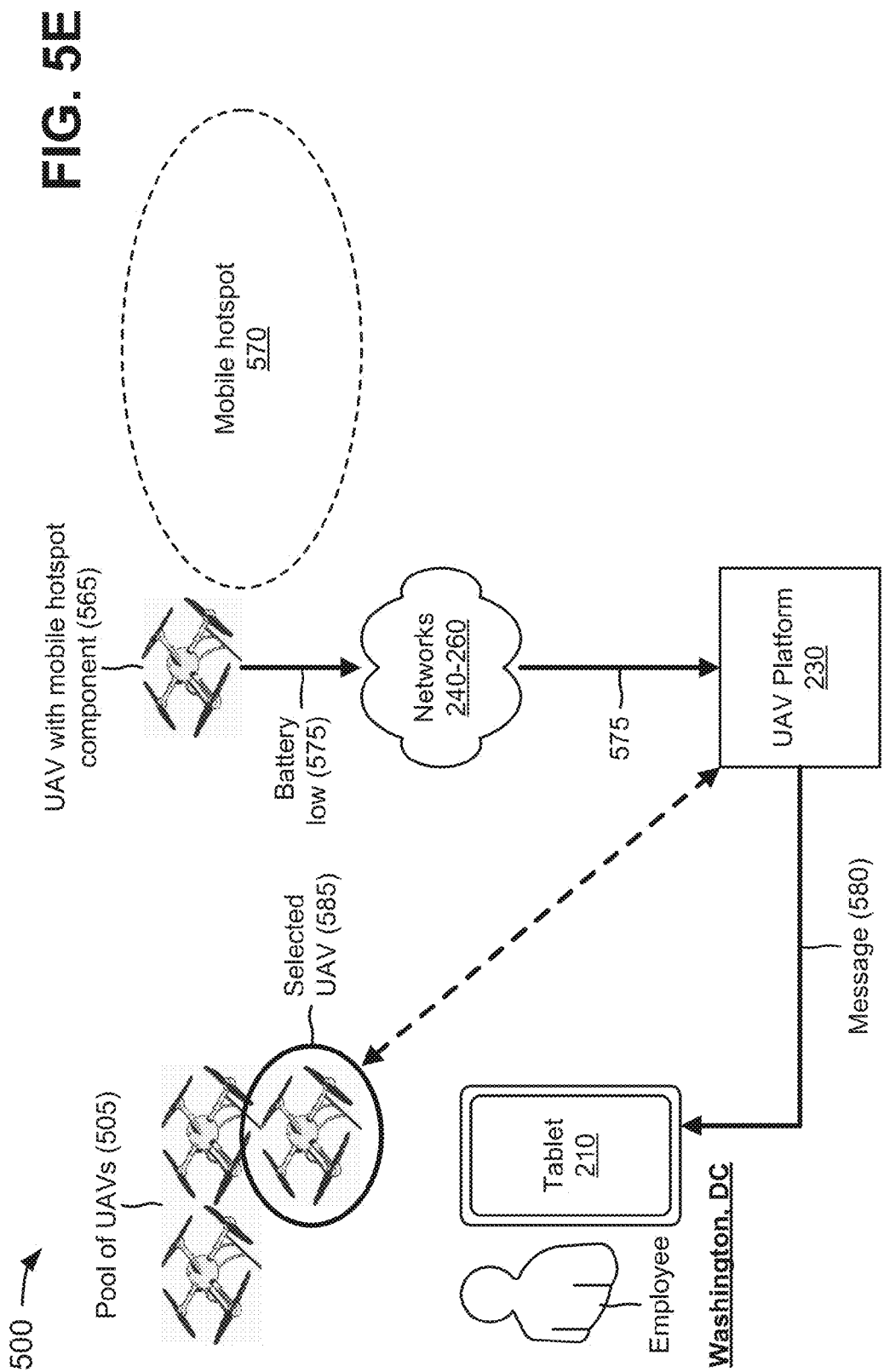

As shown in FIG. 5E, assume that a particular UAV 220 (e.g., referred to as UAV 565) includes a mobile hotspot component. The mobile hotspot component may enable UAV 565 to generate a mobile hotspot 570 for a particular area (e.g., at a stadium during an event to provide additional coverage for the event, in remote areas that do not include cell towers, for people located in remote areas, etc.). For example, UAV 565 may fly to the particular area, and may hover above the particular area. The mobile hotspot component of UAV 565 may generate mobile hotspot 570, such that UAV 565 may act as a network access point for user devices 210, other UAVs 220, etc.

As further shown in FIG. 5E, a battery of UAV 565 may be running low on power, and UAV 565 may provide, to UAV platform 230, feedback 575 indicating that the battery of UAV 565 is running low. UAV platform 230 may receive feedback 575, and may determine that UAV 565 needs to be replaced with one of UAVs 220 in pool 505 in order to maintain mobile hotspot 570. UAV platform 230 provide, to tablet 210, a message 580 indicating that UAV platform 230 is going to replace UAV 565 with one of UAVs 220 in pool 505. As further shown in FIG. 5E, assume that UAV platform 230 selects a particular UAV 220 (e.g., referred to as selected UAV 585), from UAVs 220 in pool 505. For example, UAV platform 230 may score and rank UAVs 220 in pool 505 based on whether UAVs 220 include a mobile hotspot component, battery life of UAVs 220, etc. Selected UAV 585 may be ranked the highest in pool 505 since selected UAV 585 includes a mobile hotspot component and has the greatest battery life of UAVs 220 in pool 505 (e.g., that include mobile hotspot components).

Figure 5F:
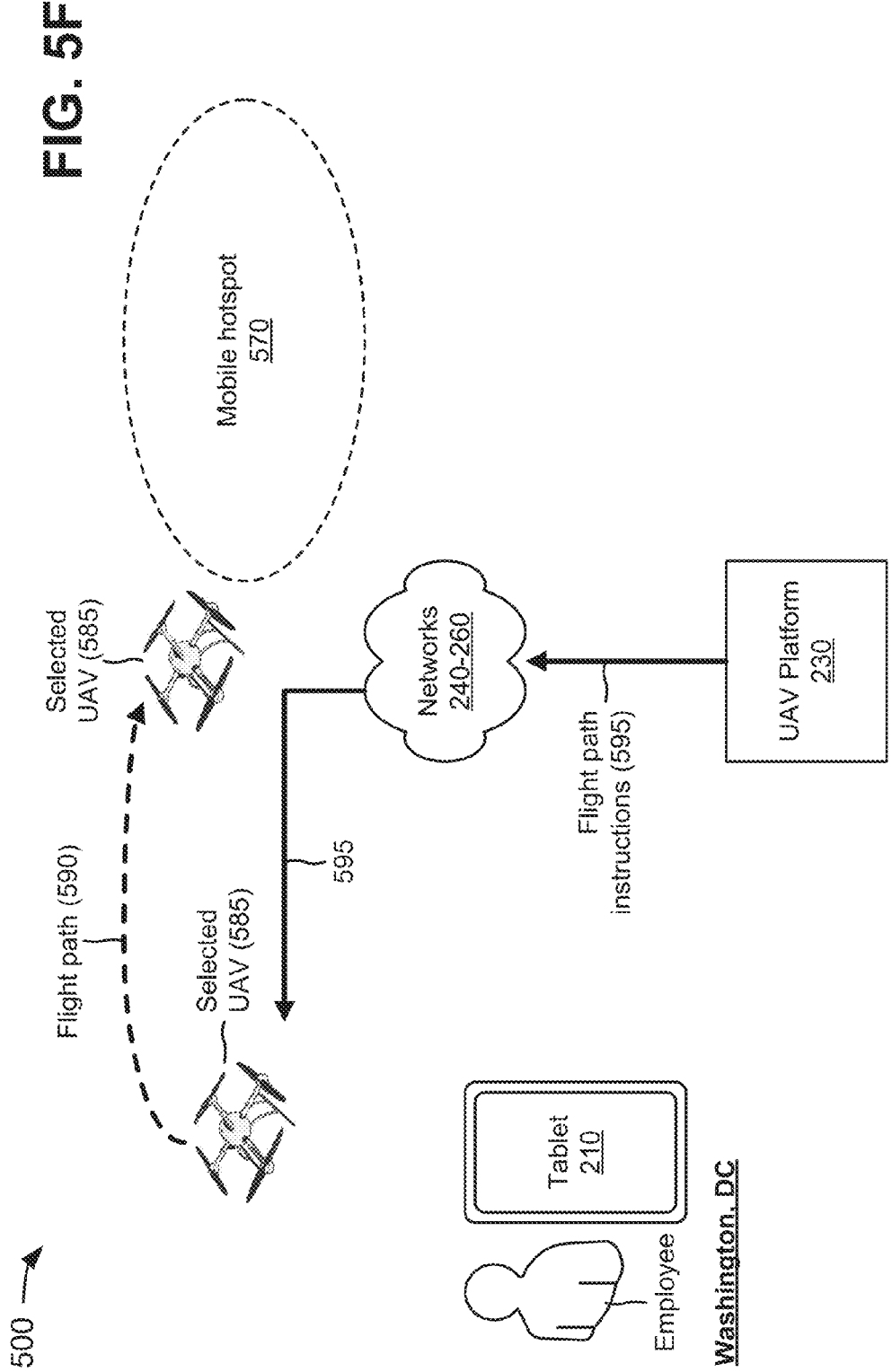

As shown in FIG. 5F, UAV platform 230 may calculate a flight path 590, for the selected UAV 585, from Washington, D.C. to the particular area, and may generate flight path instructions 595 for flight path 590. UAV platform 230 may provide flight path instructions 595 to the selected UAV 585 via one or more of networks 240-260. The selected UAV 585 may take off from Washington, D.C., and may travel flight path 590 based on flight path instructions 595. When the selected UAV 585 arrives at the particular area, the mobile hotspot component of the selected UAV 585 may generate mobile hotspot 570 for the particular area, as further shown in FIG. 5F. UAV platform 230 may instruct UAV 565 to return to Washington, D.C. so that UAV 565 may recharge the low battery.

As indicated above, FIGS. 5A-5F are provided merely as an example. Other examples are possible and may differ from what was described with regard to FIGS. 5A-5F.

Systems and/or methods described herein may provide a platform that enables UAVs to safely traverse flight paths from origination locations to destination locations. The systems and/or methods may enable the platform to determine flight paths for UAVs, and to automatically select optimal UAVs for traversing the determined flight paths, which may increase utilization of the UAVs. The automatic selection of optimal UAVs for traversing the determined flight paths may also reduce costs associated with selecting UAVs for the determined flight paths.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user (e.g., via a touch screen display, a mouse, a keyboard, a keypad, voice commands, etc.).

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for enabling unmanned aerial vehicles to traverse flight paths from origination locations to destination locations, the method comprising:
    receiving, by a device, a request for a flight path from a first geographical location to a second geographical location in a region;
    calculating, by the device, the flight path from the first geographical location to the second geographical location based on the request for the flight path and based on one or more of weather information, air traffic information, obstacle information, regulatory information, or historical information associated with the region;
    determining, by the device, required capabilities for the flight path based on the request for the flight path;
    selecting, by the device and from a plurality of unmanned aerial vehicles, a particular unmanned aerial vehicle based on the required capabilities for the flight path and based on a ranking of the plurality of unmanned aerial vehicles;
    generating, by the device, flight path instructions for the flight path; and
    providing, by the device, the flight path instructions to the particular unmanned aerial vehicle to permit the particular unmanned aerial vehicle to travel from the first geographical location to the second geographical location via the flight path.

2. The method of claim 1, where determining the required capabilities for the flight path comprises at least one of:
    determining the required capabilities for the flight path based on the first geographical location and the second geographical location;
    determining the required capabilities for the flight path based on component requirements associated with the flight path;
    determining the required capabilities for the flight path based on physical requirements associated with the flight path; or
    determining the required capabilities for the flight path based on the one or more of the weather information, the air traffic information, the obstacle information, the regulatory information, or the historical information associated with the region.

3. The method of claim 1, where the ranking of the plurality of unmanned aerial vehicles is determined prior to receiving the request for the flight path.

4. The method of claim 1, where selecting the particular unmanned aerial vehicle comprises:
    assigning weights to capability information associated with the plurality of unmanned aerial vehicles;
    calculating a score, for each of the plurality of unmanned aerial vehicles, based on the assigned weights; and
    selecting the particular unmanned aerial vehicle, from the plurality of unmanned aerial vehicles, based on the calculated scores and based on the required capabilities for the flight path.

5. The method of claim 4, where selecting the particular unmanned aerial vehicle comprises:
    determining the ranking of the plurality of unmanned aerial vehicles based on the calculated scores; and
    selecting the particular unmanned aerial vehicle, from the plurality of unmanned aerial vehicles, based on the ranking of the plurality of unmanned aerial vehicles.

6. The method of claim 4, where different weights are assigned to different types of the capability information.

7. The method of claim 1, where the particular unmanned aerial vehicle includes a mobile hotspot component that permits the particular unmanned aerial vehicle to generate a mobile hotspot at the second geographical location.

8. A system for enabling unmanned aerial vehicles to traverse flight paths from origination locations to destination locations, the system comprising:
    one or more devices to:
        receive a request for a flight path from a first geographical location to a second geographical location in a region;
        calculate the flight path from the first geographical location to the second geographical location based on the request for the flight path and based on:
            one or more of air traffic information, regulatory information, or historical information associated with the region, and
            one or more of weather information or obstacle information;
        determine required capabilities for the flight path based on the request for the flight path;
        select, from a plurality of unmanned aerial vehicles, a particular unmanned aerial vehicle based on the required capabilities for the flight path and based on a ranking of the plurality of unmanned aerial vehicles;
        generate flight path instructions for the flight path; and
        provide the flight path instructions to the particular unmanned aerial vehicle to permit the particular unmanned aerial vehicle to travel from the first geographical location to the second geographical location via the flight path.

9. The system of claim 8, where, when determining the required capabilities for the flight path, the one or more devices are to at least one of:
    determine the required capabilities for the flight path based on the first geographical location and the second geographical location;
    determine the required capabilities for the flight path based on component requirements associated with the flight path;
    determine the required capabilities for the flight path based on physical requirements associated with the flight path; or
    determine the required capabilities for the flight path based on the one or more of the weather information, the air traffic information, the obstacle information, the regulatory information, or the historical information associated with the region.

10. The system of claim 8, where the ranking of the plurality of unmanned aerial vehicles is determined prior to receiving the request for the flight path.

11. The system of claim 8, where, when selecting the particular unmanned aerial vehicle, the one or more devices are to:

assign weights to capability information associated with the plurality of unmanned aerial vehicles;

calculate a score, for each of the plurality of unmanned aerial vehicles, based on the assigned weights; and select the particular unmanned aerial vehicle, from the plurality of unmanned aerial vehicles, based on the calculated scores and based on the required capabilities for the flight path.

12. The system of claim 11, where, when selecting the particular unmanned aerial vehicle, the one or more devices are to:

determine the ranking of the plurality of unmanned aerial vehicles based on the calculated scores; and select the particular unmanned aerial vehicle, from the plurality of unmanned aerial vehicles, based on the ranking of the plurality of unmanned aerial vehicles.

13. The system of claim 11, where different weights are assigned to different types of the capability information.

14. The system of claim 8, where the particular unmanned aerial vehicle includes a mobile hotspot component and the one or more devices are to:

instruct the particular unmanned aerial vehicle to travel to the second geographical location and generate a mobile hotspot at the second geographical location.

15. A computer-readable medium for storing instructions for enabling unmanned aerial vehicles to traverse flight paths from origination locations to destination locations, the instructions comprising:

one or more instructions that, when executed by one or more processors of a device, cause the one or more processors to:

receive a request for a flight path from a first geographical location to a second geographical location in a region;

calculate the flight path from the first geographical location to the second geographical location based on the request for the flight path and based on one or more of weather information, air traffic information, obstacle information, regulatory information, or historical information associated with the region;

determine required capabilities for the flight path based on the request for the flight path;

select, from a plurality of unmanned aerial vehicles, a particular unmanned aerial vehicle based on the required capabilities for the flight path and based on a ranking of the plurality of unmanned aerial vehicles;

generate flight path instructions for the flight path; and provide the flight path instructions to the particular unmanned aerial vehicle to permit the particular unmanned aerial vehicle to travel from the first geographical location to the second geographical location via the flight path.

16. The computer-readable medium of claim 15, where the instructions to determine the required capabilities for the flight path comprise:

one or more instructions that, when executed by the one or more processors, cause the one or more processors to at least one of:

determine the required capabilities for the flight path based on the first geographical location and the second geographical location;

determine the required capabilities for the flight path based on component requirements associated with the flight path;

determine the required capabilities for the flight path based on physical requirements associated with the flight path; or determine the required capabilities for the flight path based on the one or more of the weather information, the air traffic information, the obstacle information, the regulatory information, or the historical information associated with the region.

17. The computer-readable medium of claim 15, where the ranking of the plurality of unmanned aerial vehicles is determined prior to receiving the request for the flight path.

18. The computer-readable medium of claim 15, where the instructions to select the particular unmanned aerial vehicle comprise:

one or more instructions that, when executed by the one or more processors, cause the one or more processors to:

assign weights to capability information associated with the plurality of unmanned aerial vehicles;

calculate a score, for each of the plurality of unmanned aerial vehicles, based on the assigned weights; and select the particular unmanned aerial vehicle, from the plurality of unmanned aerial vehicles, based on the calculated scores and based on the required capabilities for the flight path.

19. The computer-readable medium of claim 18, where the instructions to select the particular unmanned aerial vehicle comprise:

one or more instructions that, when executed by the one or more processors, cause the one or more processors to:

determine the ranking of the plurality of unmanned aerial vehicles based on the calculated scores; and select the particular unmanned aerial vehicle, from the plurality of unmanned aerial vehicles, based on the ranking of the plurality of unmanned aerial vehicles.

20. The computer-readable medium of claim 15, where the instructions further comprise:

one or more instructions that, when executed by the one or more processors, cause the one or more processors to at least one of:

instruct the particular unmanned aerial vehicle to travel to the second geographical location and generate a mobile hotspot at the second geographical location.

* * * * *